United States Patent [19]

Shimizu et al.

[11] Patent Number: 4,992,702
[45] Date of Patent: Feb. 12, 1991

[54] INVERTER CAPABLE OF CONTROLLING OPERATING FREQUENCY

[75] Inventors: Keiichi Shimizu; Kenichi Inui; Nanjou Aoike, all of Yokohama, Japan

[73] Assignee: Toshiba Electric Equipment Corporation, Tokyo, Japan

[21] Appl. No.: 284,377

[22] Filed: Dec. 14, 1988

[30] Foreign Application Priority Data

Dec. 17, 1987 [JP] Japan .................... 62-317462

[51] Int. Cl.⁵ .................. H05B 37/02; H05B 39/04; H02M 3/24
[52] U.S. Cl. .......................... 315/219; 315/DIG. 5; 315/DIG. 7; 315/307; 315/283; 363/97; 363/131
[58] Field of Search ............... 315/219, 220, 283, 307, 315/DIG. 5, DIG. 7; 363/97, 106, 109, 131

[56] References Cited

U.S. PATENT DOCUMENTS

| | | | |
|---|---|---|---|
| 3,746,921 | 7/1973 | Marshall et al. | 315/DIG. 7 |
| 4,228,382 | 10/1980 | Virtanen | 315/219 |
| 4,488,210 | 12/1984 | Shono | 363/131 |
| 4,513,226 | 4/1985 | Josephson | 315/DIG. 7 |
| 4,686,427 | 8/1987 | Burke | 315/219 |
| 4,700,113 | 10/1987 | Stupp et al. | 315/307 |

FOREIGN PATENT DOCUMENTS

| | | |
|---|---|---|
| 0063974 | 11/1982 | European Pat. Off. |
| 3303374 | 8/1984 | Fed. Rep. of Germany |
| 3315481 | 10/1984 | Fed. Rep. of Germany |
| 1457883 | 12/1976 | United Kingdom ............... 363/131 |

OTHER PUBLICATIONS

"IEEE Standard Dictionary of Electrical and Electronic Terms" Third Edition Jul. 20, 1984.

Primary Examiner—Eugene R. Laroche
Assistant Examiner—M. Shingleton
Attorney, Agent, or Firm—Cushman, Darby & Cushman

[57] ABSTRACT

An inverter is made up of a parallel circuit as a voltage resonance circuit, and a first diode, which are connected in series between both ends of a power source. The parallel resonance circuit includes the primary winding of an output transformer of the leakage type, and a resonance capacitor. The first diode is connected at the cathode to the primary winding of the output transformer. The secondary winding of the output transformer is coupled with a load such as a discharge lamp. The cathode and anode of the first diode are respectively connected to the collector and emitter of a transistor. A series circuit of a second diode and capacitor is connected across the collector-emitter path of the transistor. The second diode is forwardly arranged with respect to the transistor. A voltage detector comprises the capacitor and two resistors which are connected in series, and connected across the capacitor. The output voltage is derived from the node of those resistors. An error amplifier compares the output voltage of the voltage detector and an output voltage from a reference voltage source. A VCO oscillates at a switching frequency based on the comparison result. The oscillation output signal is applied to the base of the transistor.

16 Claims, 9 Drawing Sheets

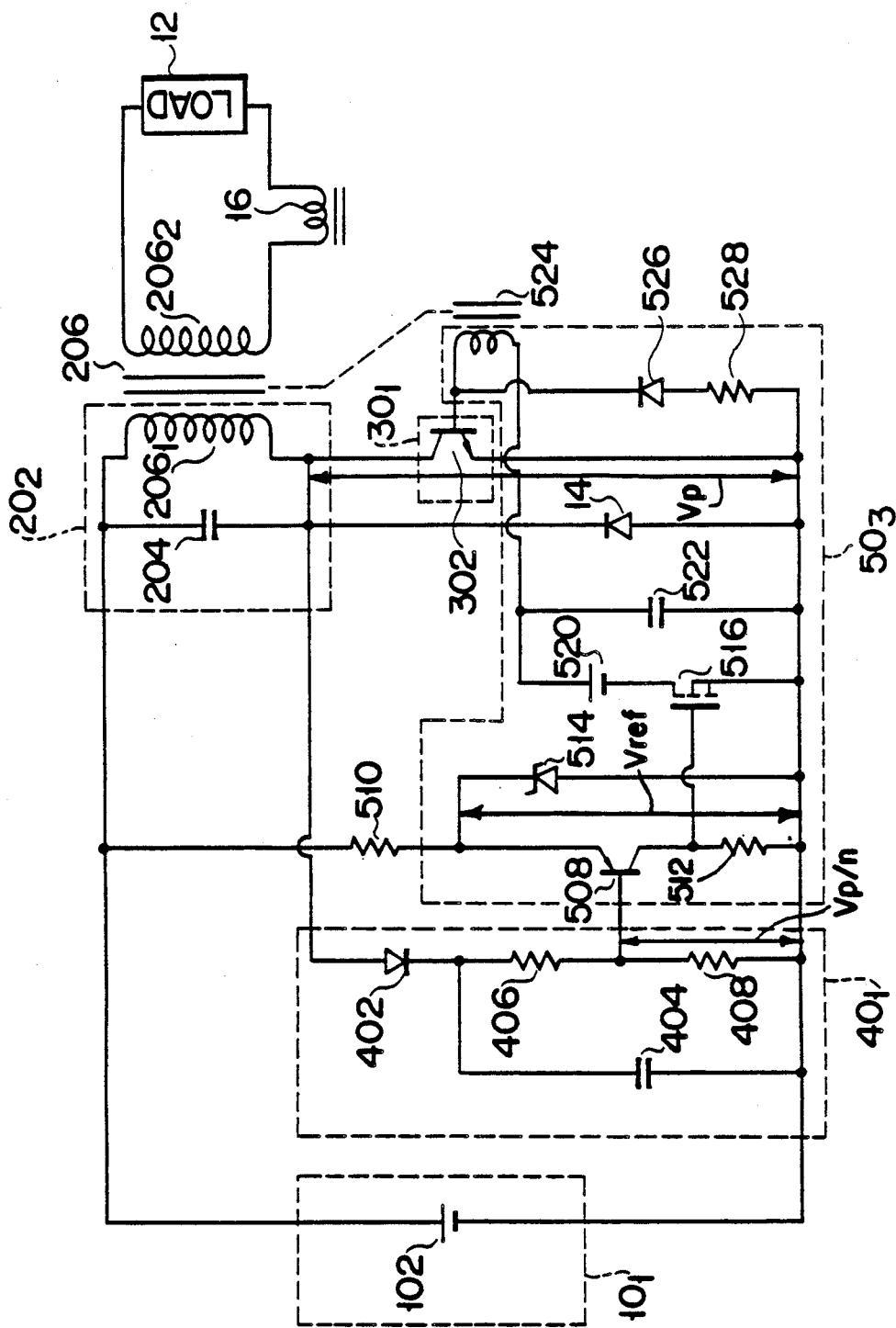
F I G. 5

4,992,702

INVERTER CAPABLE OF CONTROLLING OPERATING FREQUENCY

BACKGROUND OF THE INVENTION

1. Field of the Invention

This invention relates to an inverter, and more particularly, to an inverter for operating a gas discharge lamp, such as a fluorescent lamp, at a high frequency.

2. Description of the Related Art

The most common example for an inverter for converting a DC power to an AC power is a voltage resonance type inverter provided with a parallel voltage resonance circuit and a switching element. The switching element interrupts an input DC voltage at a high frequency, which is higher than an acoustic frequency, e.g., 20 to 100 kHz, and applies the thus formed AC voltage to the voltage resonance circuit. The AC voltage induced into the voltage resonance circuit is supplied to a load.

In this type of the inverter, any particular measure is not used for controlling an operating frequency, i.e., a frequency of the on/off operation of the switching element. Therefore, the operating frequency is normally fixed in the self-excited inverter, while it depends on a load to which an AC voltage is to be supplied. These inverters are disclosed in Japanese Patent Publication No. 57-45040, Japanese Patent Disclosure (Kokai) No. 61-2299, and Japanese Utility Model Disclosure (Kokai) No. 62-69396.

In the separately excited inverter, the voltage applied to the switching element depends on an operating state of the load receiving the AC voltage. In the case of the inverter followed by a load with a great load variation, such as a discharge lamp, the voltage applied to the switching element is apt to be an overvoltage. To cope with this, the switching element used must have a high breakdown voltage. This implies that the switching element for the inverter is expensive and hence the cost to manufacture the resultant inverter is increased.

SUMMARY OF THE INVENTION

Accordingly, an object of the present invention is to provide an inverter which surely prevents a switching element from being applied with an overvoltage at low cost and lessens variation in output voltage with respect to a power voltage.

According to an aspect of the present invention, there is provided an inverter capable of controlling an operating frequency comprising means for supplying a DC voltage, switching means for switching the voltage from the DC voltage supply means, parallel voltage resonance circuit including an inductor coupled in series with the switching means, the inductor and the switching means both being connected between both ends of the DC voltage supply means, and a resonance capacitor, voltage detecting means for detecting a voltage applied to the switching means, and control means for controlling a switching frequency of the switching means, on the basis of the result of comparison of a voltage value detected by the voltage detecting means and a predetermined reference voltage.

BRIEF DESCRIPTION OF THE DRAWINGS

The aforementioned aspect and other features of the present invention are explained in the following description, taken in connection with the accompanying drawings, wherein:

FIG. 5 is a circuit diagram showing an operator a discharge lamp using a self-excited inverter, which is a fourth embodiment of the present invention;

FIGS. 10A through 10C are timing charts showing variations of signals at key points in the inverter according to a first embodiment of the present invention, in which FIG. 10A shows a variation of an input signal to an error amplifier, FIG. 10B, a variation of an input signal to a voltage controlled oscillator, and FIG. 10C, a variation of an oscillating frequency of the voltage controlled oscillator.

DETAILED DESCRIPTION OF THE PREFERRED EMBODIMENTS

Preferred embodiments of the present invention will be described with reference to the accompanying drawings.

Figure 1:
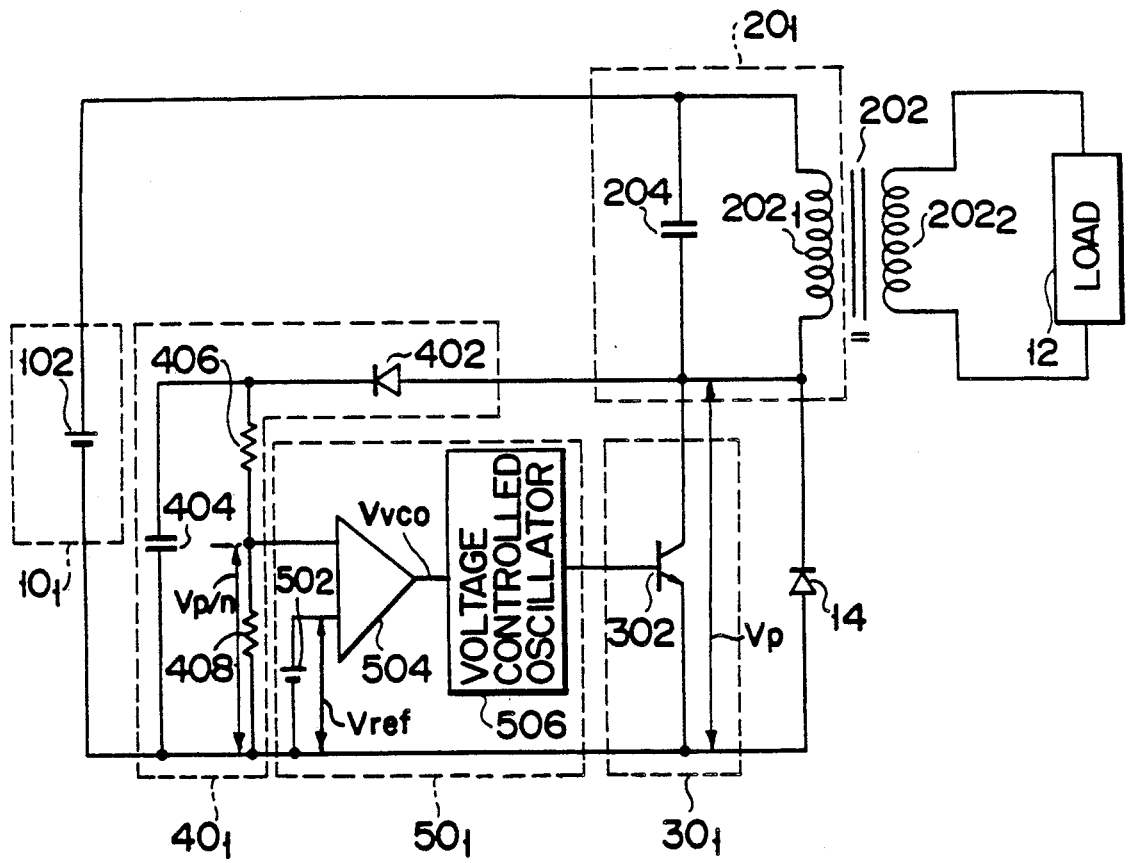
FIG. 1 is a circuit diagram showing an apparatus for operating a discharge lamp using a separately excited inverter, which is a first embodiment of the present invention.

FIG. 1 shows a circuit arrangement of an apparatus for operating a discharge lamp to which a separately excited inverter according to an embodiment of the present invention is applied. In the figure, DC power source 102 makes up a power source circuit $10_1$, which may be a pure DC power source such as a battery, or a rectifier circuit for rectifying an AC power source, which is of smoothing, partially smoothing, or nonsmoothing type.

Reference numeral $20_1$ designates a voltage resonance circuit. In the circuit, the primary winding $202_1$ of output transformer 202 of the leakage type is connected at one end to the positive terminal of DC power source 102 in the DC power source circuit $10_1$, and at the other end to the collector of transistor 302 constituting switching element $30_1$. Resonance capacitor 204 is coupled in parallel with the primary winding $202_1$ of output transformer 202. Load 12 such as a discharge lamp including a fluorescent lamp is connected across the secondary winding $202_2$ of output transformer 202. Diode 14 is connected to the collector and emitter (negative terminal of DC power source 102) of transistor 302, in a back-to-back manner. Voltage detector $40_1$ is further connected between the collector and emitter of transistor 302. Detector $40_1$ includes a series circuit made up of diode 402 and capacitor 404. Diode 402 is coupled with the collector-emitter path of transistor 302 in a forward direction. This capacitor 404 is coupled in parallel with a series circuit including resistors 406 and 408. These resistors 406, 408 divide the voltage across capacitor 404, to form a voltage for application to control circuit $50_1$ to be described later.

Figure 2:
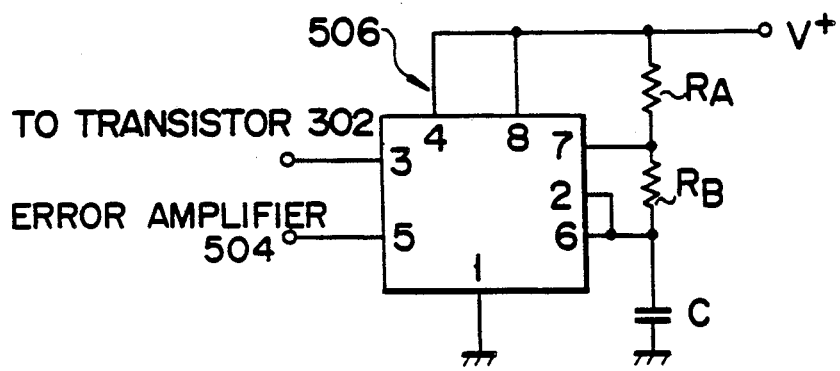
FIG. 2 is a circuit diagram showing an arrangement of a voltage controlled oscillator used in the circuit shown in FIG. 1.

Control circuit $50_1$ drives transistor 302 by a frequency depending on the collector-emitter voltage of transistor 302. As shown, control circuit $50_1$ is made up of reference voltage source 502, error amplifier 504, and voltage controlled oscillator (VCO) 506. Amplifier 504 compares the output voltage of voltage detector $40_1$ as appears at a node resistors 406 and 408, and the output voltage of reference voltage source 502, and produces a difference voltage as an error voltage. VCO 506 oscillates at a frequency depending on the output signal of error amplifier 504. VCO 506 may be an integrated circuit, such as NJM 555 manufactured by Shin-Nihon Musen Co., in Japan. FIG. 2 shows a circuit arrangement including VCO 506 consisting of the above IC and its peripheral circuitry. In the figure, V+ designates a power source voltage for the IC, and $R_A$, $R_B$, and C are resistors and capacitor with proper values.

The operation of the apparatus for operating a discharge lamp thus arranged, which is a first embodiment of the present invention, will be described with reference to FIGS. 1, 10A through 10C.

DC power source 102 is turned on, VCO 506 starts oscillation, and the oscillator output signal VVCO is applied to the base of transistor 302. Transistor 302 is alternately turned on and off at the oscillating frequency ($f_1$) of VCO 506. The output signal of transistor 302 drives parallel (voltage) resonance circuit $20_1$ substantially consisting of primary winding $202_1$ of output transformer 202 and resonance capacitor 204, so that a high frequency output voltage is induced in the secondary winding $202_2$ of output transformer 202. In this way, the inverter is started up.

In a stationary mode, in voltage detector $40_1$, capacitor 404 has been charged to a value approximate to a peak value Vo of the collector voltage of transistor 302, through diode 402. In control circuit $50_1$, oscillating frequency $f_1$ of VCO 506 is controlled so that voltage Vp/n is equal to reference voltage Vref as the output voltage of reference voltage source 502. The voltage Vp/n is obtained by dividing the terminal voltage (Vp) of capacitor 404 by resistors 406 and 408, and "n" is a voltage dividing ratio. Oscillating frequency $f_1$ of VCO 506 is selected to be much higher than the resonance frequency ($f_0$) of voltage resonance circuit $20_1$, for example.

Figure 10A:
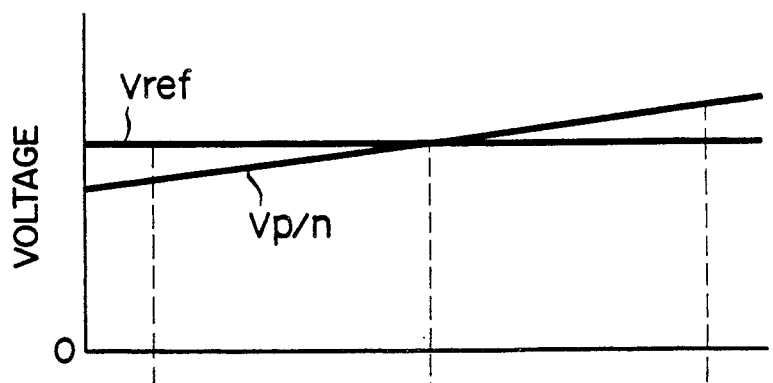
Figure 10B:
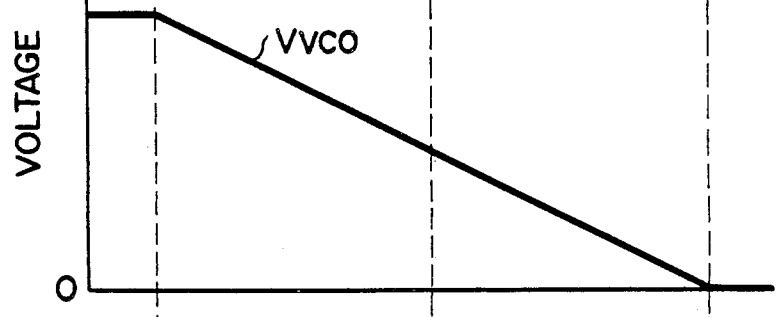
Figure 10C:
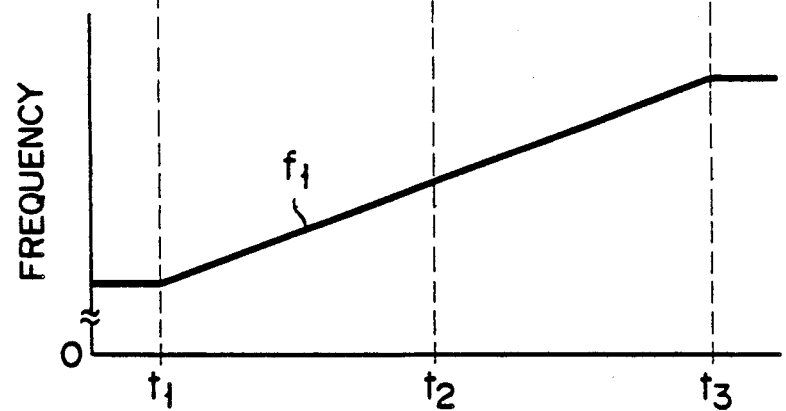

Reference is made to FIGS. 10A through 10C showing variations of an input voltage to error amplifier 504, an input voltage to VCO 506, and an oscillating frequency of VCO 506. It is assumed that voltage Vp/n is lower than reference voltage Vref at time $t_1$, as shown in FIG. 10A. As the voltage $V_{CE}$ across the collector-emitter path of transistor 302 becomes higher, voltage Vp/n gradually rises, and reaches reference voltage Vref at time $t_2$, and exceeds Vref during period from time $t_2$ and $t_3$. On the other hand, the input voltage to VCO 506 gradually decreases from time $t_1$ and is zeroed at time $t_3$, as shown in FIG. 10B. An oscillating frequency $f_1$ of VCO 506 gradually increases from time $t_1$ to $t_3$ as its input voltage decreases. The increasing oscillating frequency $f_1$ causes the collector-emitter voltage of transistor 302 to drop, and it is kept constant. The regions below $t_1$ and above $t_3$ in FIGS. 10A-10C are saturated regions.

In a stationary mode, when peak voltage Vp becomes higher than preset voltage Vset, the voltage Vp/n, which is obtained by dividing terminal voltage Vp by resistors 406 and 408, becomes higher than reference voltage Vref, as seen from the time period between $t_2$ and $t_3$ shown in FIGS. 10A through 10C, so that the output voltage of error amplifier 504 drops. Consequently, the oscillating frequency $f_1$ of VCO 506, i.e., operating frequency $f_1$ of the inverter increases. In turn, operating frequency $f_1$ is deviated from resonance frequency $f_0$, and peak voltage Vp drops. At the same time, the high frequency output voltage, which is supplied from the secondary winding $202_2$ of output transformer 202 to load 12, is also decreased.

As seen from the time period between $t_2$ and $t_1$ shown in FIGS. 10A through 10C, peak voltage Vp becomes lower than preset voltage Vref, and voltage Vp/n goes below reference voltage Vref, and consequently the output voltage of error amplifier 504 increases. With the increasing of the amplifier output voltage, oscillating frequency $f_1$ of VCO 506, viz., the operating frequency $f_1$ of the inverter, decreases. Finally, operating frequency $f_1$ approaches to resonance frequency $f_0$, and both the peak voltage Vp and high frequency output voltage rise.

In this way, the separately excited inverter shown in FIG. 1 is controlled so that peak voltage Vp is constant, i.e., Vp=Vset=nVref.

In the first embodiment as mentioned above, the inverter is applied for an apparatus for operating a discharge lamp, and it must be operated stably. To this end, the output transformer of the leakage type is used. In other applications, for example, when the load is not a discharge lamp, or a discharge lamp coupled with a ballast, the normal transformer, not a leakage type transformer, may be used.

Figure 3:
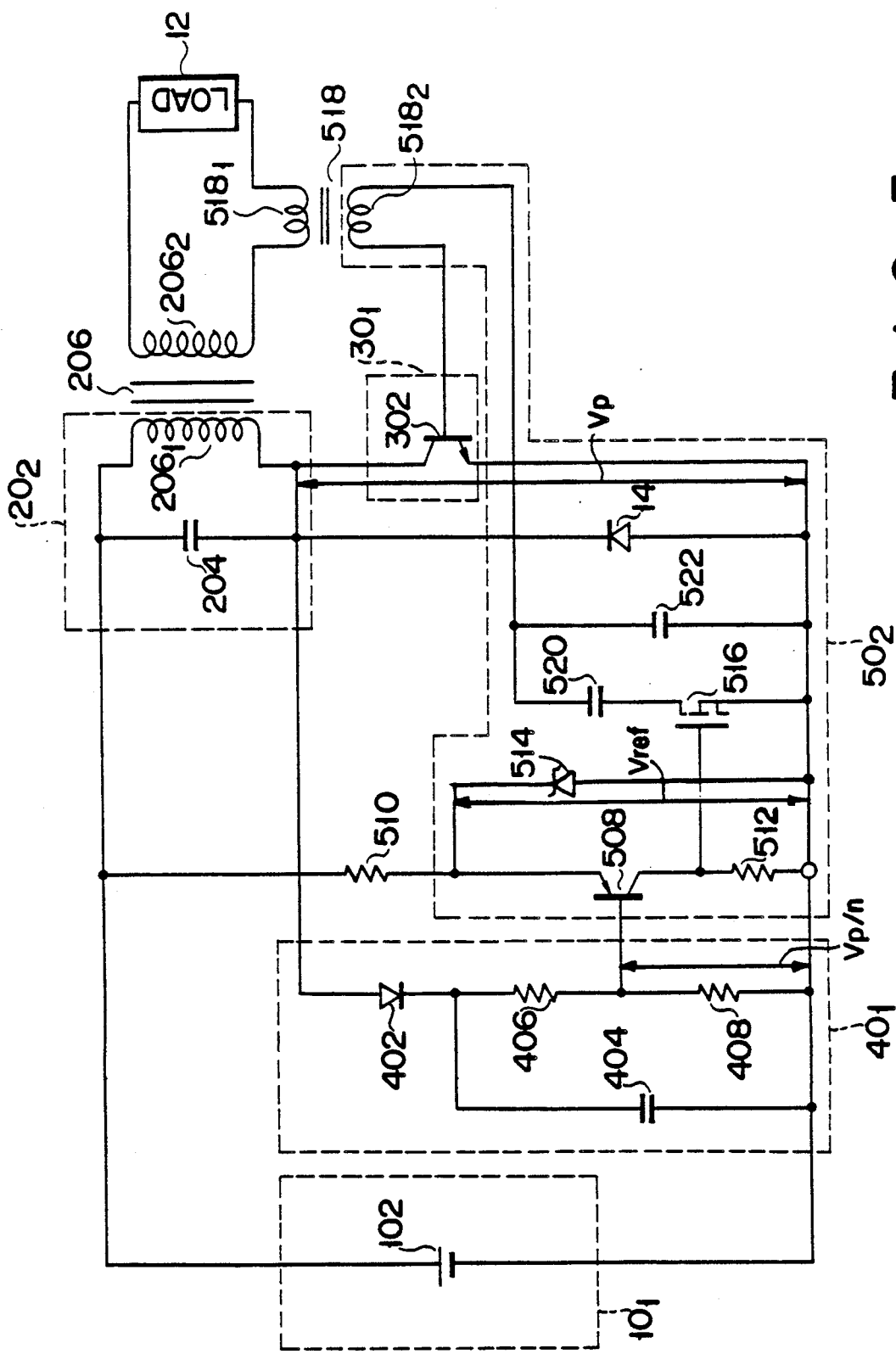
FIG. 3 is a circuit diagram showing an operator device in use with a discharge lamp using a self-excited inverter, which is a second embodiment of the present invention.

An embodiment of an apparatus for a discharge lamp to which a self-excited inverter is applied, will be described referring to FIG. 3. In FIG. 3, like reference symbols are used for designate like or equivalent portions in FIG. 1, for simplicity.

In FIG. 3, voltage resonance circuit $20_2$ is so arranged that one end of the primary winding $206_1$ of output transformer 206 is connected to the positive terminal of DC power source 102 of power source circuit $10_1$, and the other end is connected to the collector of the transistor 302 of switching element $30_1$. Resonance capacitor 204 is coupled in parallel with the primary winding $206_1$ of output transformer 206. Secondary winding $206_2$ of output transformer 206 is connected at one end to load 12 and at the other end to one end of the primary winding $518_1$ of feedback current transformer (CT) 518.

Control circuit $50_2$ contains transistor 508 as an error detector. The base of the transistor 508 is connected to a node between resistors 406 and 408 of voltage detector $40_1$. The emitter and collector of transistor 508 are respectively coupled with the positive and negative terminals of DC power source 102 of power source circuit $10_1$. Between the emitter of transistor 508 and the negative terminal of DC power source 102, Zener diode 514 as a reference potential source is inserted with its cathode connecting to the emitter of transistor 508. The collector of transistor 508 is coupled with the gate of field effect transistor (FET) 516. The source of FET 516 is connected to the negative terminal of DC power source 102. Control circuit $50_2$ further includes feedback current transformer (CT) 518. One end of secondary winding $518_2$ is connected to the base of transistor 302 of switching element $30_1$, while the other end, to the first ends of frequency control capacitors 520 and 522. The capacitor 520 is coupled at the second end with the drain of FET 516, and capacitor 522 is coupled at the second end with the emitter of transistor 302. Diode 14 is connected across the collector-emitter path of transistor 302. Primary winding $518_1$ of feedback current transformer (CT) 518 is formed between the secondary winding $206_2$ of output transformer 206, and load 12.

The operation of the apparatus for a discharge lamp using the self-excited inverter shown in FIG. 3 will be described.

DC power source 102 is turned on. Transistor 302 is in a slight conductive state by a base current fed from a start-up circuit (not shown). A slight current in turn flows through the primary winding $206_1$ of output transformer 206, so that a load current flows through the secondary winding $206_2$. This load current is detected by CT 518, and is fed back to the base of transistor 302. Transistor 302 is swiftly turned on through a route including the base of transistor 302, the emitter, capacitor 522 (FET 516 - capacitor 520), CT 518, and the base. The capacitors 520 and 522 are charged by the base current, which turns on transistor 302. Therefore, when transistor 302 is turned on, the base current gradually decreases. Then, through the above feedback loop, transistor 302 rapidly turns off. When transistor 302 is in an off state, voltage resonance circuit $20_1$ (including the primary winding $206_1$ of output transformer 206 and capacitor 204) resonates to induce an AC voltage in the secondary winding $206_2$ of output transformer 206. With the induced AC voltage, the load current is inverted in polarity, and then its polarity is returned to the original polarity. In turn, the voltage at the base of transistor 302 is positive in polarity, and the transistor 302 is turned on again through the positive feedback loop.

In this way, the inverter continuously oscillates with the aid of the positive feedback loop and the voltage resonance.

It is assumed that in a stationary state, the capacitor 404 of voltage detector $40_1$ is charged at the voltage Vp based on the peak value of the collector voltage of transistor 302. The voltage Vp is divided by resistors 406 and 408 at dividing ratio 1/n, and is applied to the base of transistor 508. The emitter of transistor 508 has been biased at reference voltage Vref as the voltage across Zener diode 514. If voltage Vp is greater than "n" times a voltage difference between reference voltage Vref and voltage $V_{BE}$ across the base-emitter path of transistor 508 ($Vp > (Vref - V_{BE}) \times n$), transistor 508 is turned off and FET 516 is in turn turned off. As a result, capacitor 520 is disconnected an substantially only capacitor 522 is connected to the base of transistor 302. If voltage Vp is smaller than (($Vref - V_{BE}) \times n$), transistor 508 is active or in a conductive state. Under this condition, FET 516 functions as a variable impedance, and its impedance varies depending on the collector voltage of transistor 508.

In the inverter in this instance, the off period of transistor 302 as switching element $30_1$ is determined by the resonance of resonance circuit $20_1$, and is fixed. The on period of transistor 302 is determined by the base current of transistor 302, which flows into capacitors 520 and 522. The base current of transistor 302 is determined depending on capacitors 520 and 522, and impedance of FET 516, which are connected in series with the base of the transistor 302, through the primary winding $518_1$ of CT 518. Accordingly, an oscillating frequency ($f_1$) of the inverter is variable by varying the impedance of FET 516.

When peak voltage Vp drops below preset voltage Vset, the current flowing through transistor 508 increases, and the impedance of FET 516 decreases. As a result, a time period that the base current high enough to drive transistor 302 flows into capacitors 520 and 522, is long, so that the on period of transistor 302 is elongated. Consequently, the oscillating frequency ($f_1$) drops to approach to the resonance frequency ($f_0$), and peak voltage Vp rises. When peak voltage exceeds preset voltage Vset, the respective components in the above circuit operate in a reverse fashion, and peak voltage Vp drops. Therefore, peak voltage Vp is stabilized. The output voltage is also stabilized against a variation of the power source voltage.

The separately excited and self-excited inverters according to the first and second embodiments are each able to absorb a surge voltage applied to the power source voltage. When the surge voltage comes in, and it is applied to transistor 302, the surge is by-passed through the series circuit including diode 402 and capacitor 404. A steep surge is by-passed by the series circuit of diode 402 and capacitor 404, so that the peak value of the collector voltage of transistor 302 is limited. A gentle surge is also by-passed by the series circuit of diode 402 and capacitor 404, and if it is not completely by-passed, the remaining surge is absorbed through the above stabilizing operation. Therefore, the voltage applied across the collector-emitter path of transistor 302 can be limited. Thus, the inverters are capable of preventing transistor 30 from being applied with an overvoltage, and protecting it against degradation and breakdown.

The ordinary inverter of this type is provided with an output transformer whose primary winding provides an inductance component in the voltage resonator. The transformer provides an insulation between the primary and secondary sides. In the case of the above inverters, the feedback loop may be formed by only the primary side of the output transformer. Therefore, there is no need for using an insulating means for the feedback loop.

Figure 4:
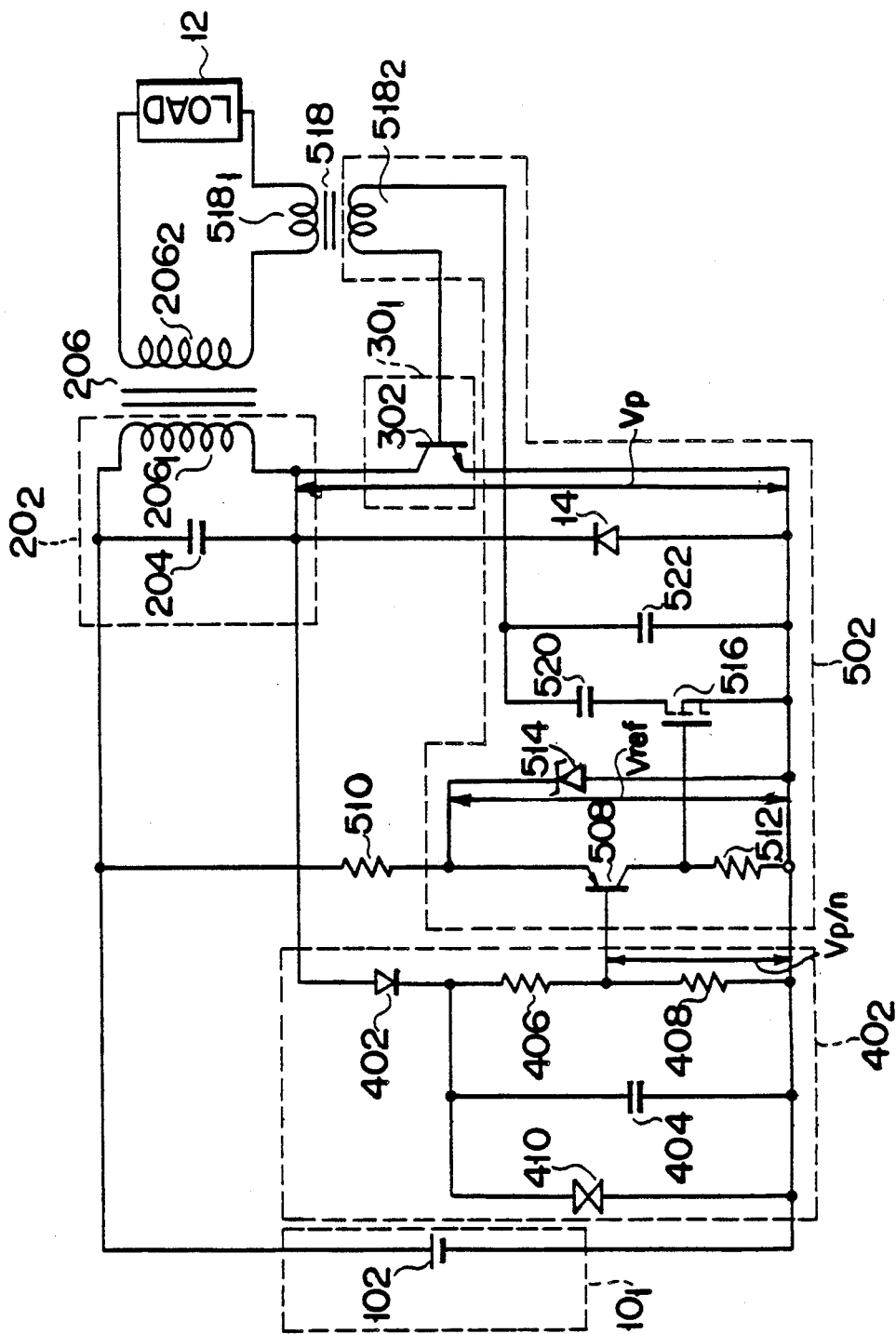
FIG. 4 is a circuit diagram showing an operator a discharge lamp using a self-excited inverter, which is a third embodiment of the present invention.

FIG. 4 shows a circuit arrangement of a modification of the self-excited inverter of the second embodiment. In FIG. 4, like reference symbols are used for designating like portions in FIGS. 1 and 3.

A series circuit of diode 402 and capacitor 404 is connected across the collector-emitter path of transistor 302 of switching element $30_1$. Diode 402 is forwardly arranged with respect to transistor 302. Capacitor 404 is connected in parallel with a series circuit of resistors 406 and 408 and varistor 410 such as a ceramic varistor. A connection point of resistors 406 and 408 is connected to the base of transistor 508 in control circuit $50_2$.

In the case of the inverter using ceramic varistor 410, when a surge is superposed on the power source voltage, it serves as a pure varistor to absorb an overvoltage applied to transistor 302. In a stationary mode, it cooperates with capacitor 404 to serve as the peak detector. At this time, capacitor 404 is charged up to a peak value of the collector voltage of transistor 302. The other operation of the present embodiment is similar to that of the second embodiment, and hence no further description will be given.

FIG. 5 shows a circuit arrangement of a fourth embodiment of the present invention, in which the output transformer is a normal transformer, not the leakage type transformer. In the figure, like reference symbols designate like or equivalent portions in FIGS. 1 and 3, and the construction and a basic operation of the fourth embodiment will not be described, for simplicity.

In FIG. 5, control circuit $50_3$ includes transistor 508 whose base is connected to a node between resistors 406 and 408. The emitter and controller of transistor 508 are connected through resistors 510 and 512 to the positive and negative terminals of DC power source 102, respectively. Between the emitter of transistor 508 and the negative terminal of DC power source 102, Zener diode 514 as a reference voltage source is inserted, with its cathode connecting to the emitter of transistor 508. The collector of transistor 508 is connected to the gate of FET 516, and the source of FET 516 is connected to the negative terminal of DC power source 102. Control circuit $50_3$ also contains feedback winding 524 of the current feedback type, which is magnetically coupled with the primary winding of the output transformer 206. One end of that winding is connected to the base of transistor 302, and to the first ends of capacitors 520 and 522 for frequency control. The second end of capacitor 520 is coupled with the drain of FET 516, and the second end of capacitor 522, with the emitter of transistor 302. A series circuit substantially consisting of die 526 and resistor 528 is coupled between the base and emitter of transistor 302, with the cathode connecting to the base. Diode 14 is connected between the collector and emitter of the same.

In the load side, a ballast 16 is inserted in a series circuit including the secondary winding $206_2$ of output transformer 206 and load 12.

The operation of the fourth embodiment follows.

DC power source 102 is turned on, and transistor 302 is turned on. The primary winding $206_1$ of output transformer 206 is slightly driven, so that a load current flows through secondary winding $206_2$. During the on period of transistor 302, the base current flows from the transistor 302 into capacitors 520 and 522 to charge these capacitors. During the off period of the transistor 302, capacitors 520 and 522 are discharged and the current flows into transformer 524, through resistor 528 and diode 526. Thus, during the off period of transistor 302, the resonance operation of voltage resonance circuit $20_2$ causes an AC voltage to induce in the secondary winding $206_2$ of output transformer 206. With the induced voltage, the polarity of the load current is inversed, and then is reversed. And transistor 302 is turned on again by the positive voltage applied to the base. In this way, the inverter oscillates.

Figure 6:
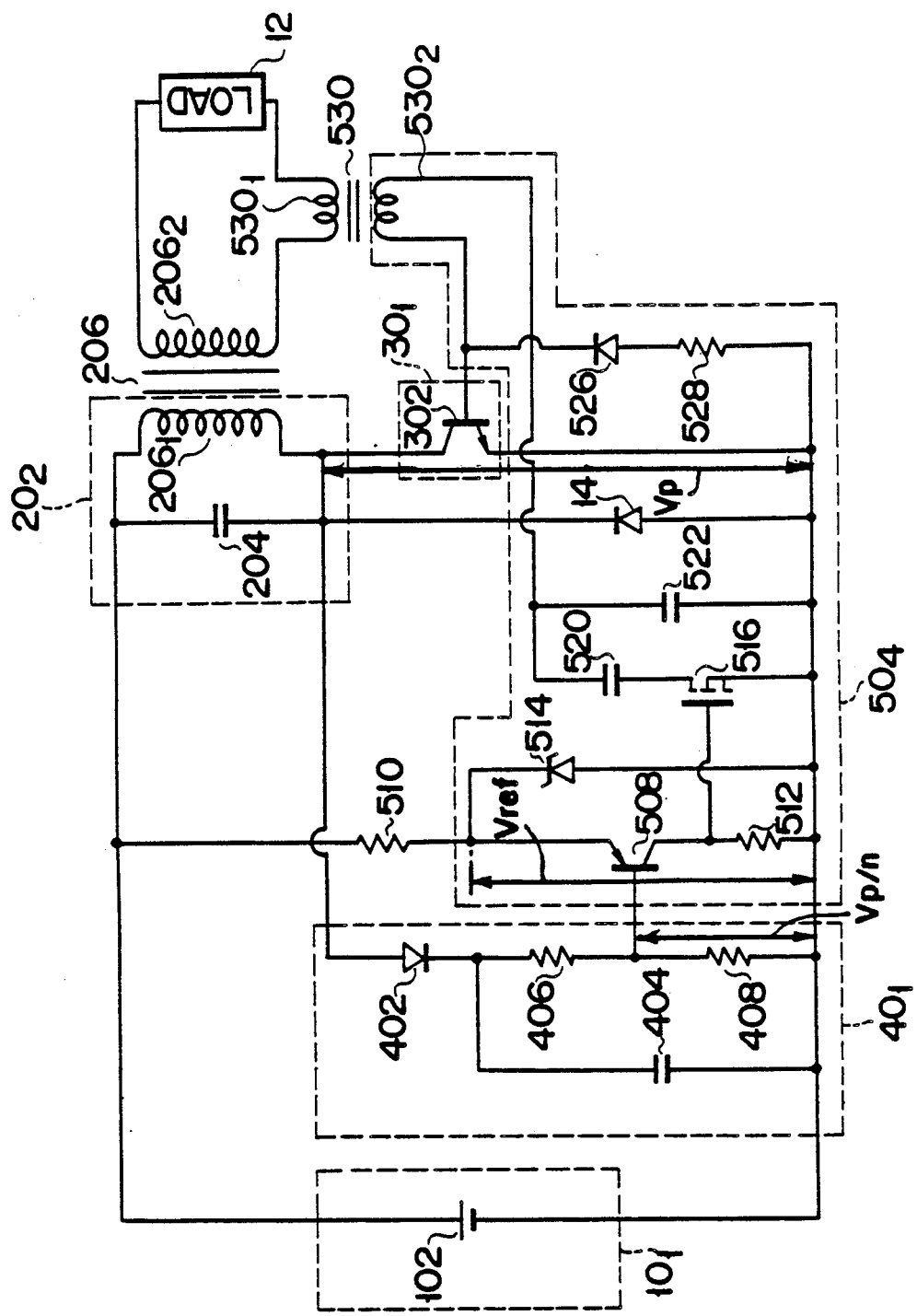
FIG. 6 is a circuit diagram showing an operator a discharge lamp using a self-excited inverter, which is a fifth embodiment of the present invention.

FIG. 6 shows a fifth embodiment of the present invention, in which a ballast with a feedback winding is used in the load side of the circuit. In the figure, like reference symbols designate like or equivalent portions in FIGS. 1, 3 through 5, and the construction and a basic operation of the fifth embodiment will not be described, for simplicity.

In the control circuit $50_4$ in FIG. 6, transformer 524 in control circuit $50_3$ shown in FIG. 5 is replaced by the ballast with a feedback winding. One end of the secondary winding $530_2$ of ballast 530 with a feedback winding is connected to the base of transistor 302, and the other end to one end of capacitor 522 for frequency control.

In the load side of the circuit, the primary winding $530_1$ is inserted in a series circuit of the secondary winding $206_2$ of output transformer 206 and load 12. The remaining circuit arrangement is substantially the same as that of the fourth embodiment, and hence no further description will be given.

In operation, during the on period of transistor 302, the inverter operates like the second embodiment. A positive feedback loop is routed from the base of transistor 302, through the emitter, capacitor 522 (FET 516 - capacitor 520), and ballast 530, to the base. During the on period of transistor 302, current flows from transistor 302 to capacitors 520 and 522 to charge these capacitors. During the of period of the transistor, capacitors 520 and 522 are discharged and current flows through resistor 528 and diode 526, and into the secondary winding $530_2$ of ballast 530. During the off period, voltage resonance circuit $20_2$ resonates to induce an AC voltage in the secondary winding $206_2$ of transformer 206. Then, the load current is inverted in polarity and its polarity is returned to the original one. The voltage applied to the base of transistor 302 becomes positive in polarity again, and the transistor 302 is turned on. In this way, the inverter of this embodiment oscillates.

While the fifth embodiment uses the ballast with the feedback winding and the capacitor for frequency control, resistor may be used for the capacitor.

Figure 7:
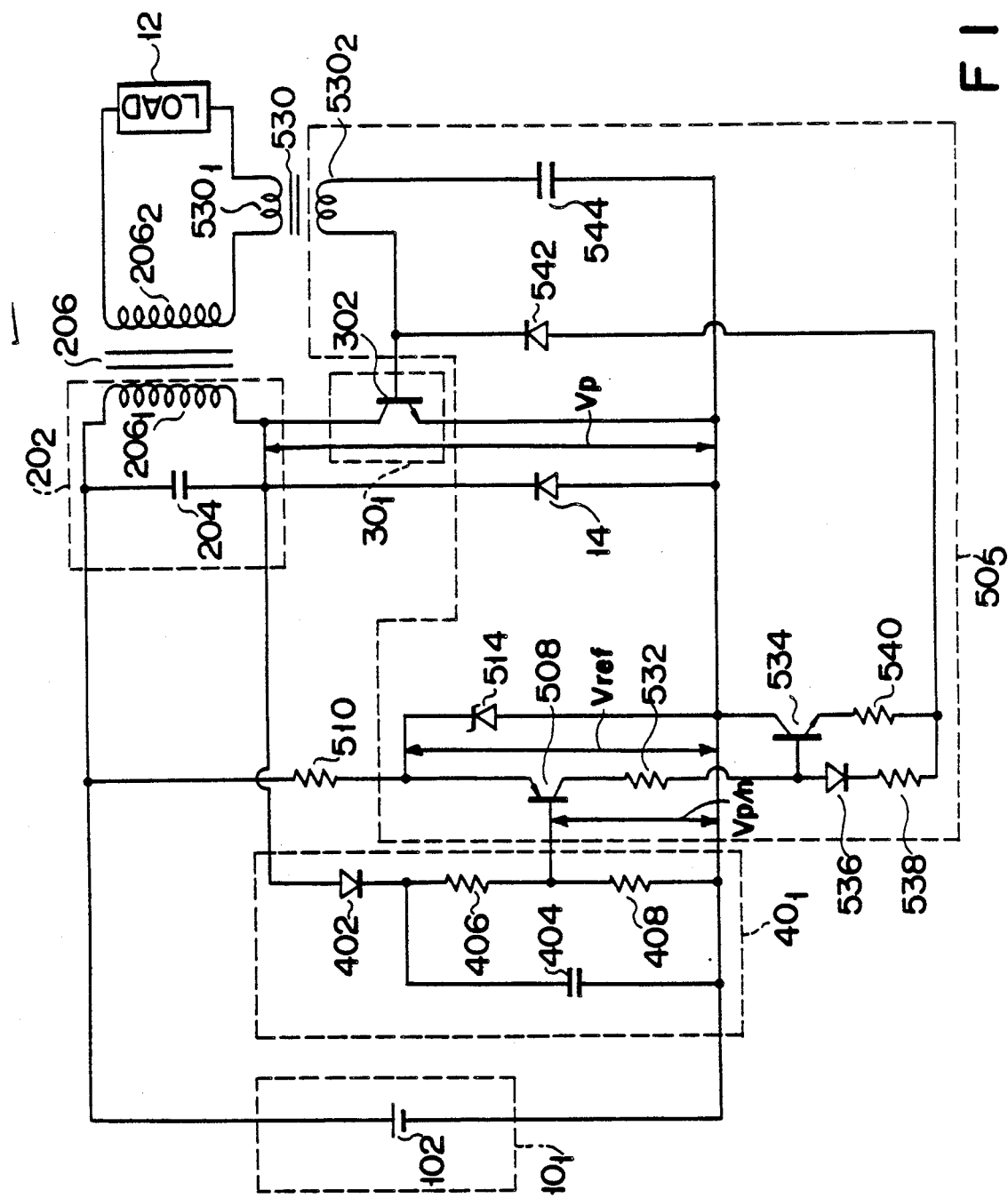
FIG. 7 is a circuit diagram showing an operator a discharge lamp using a self-excited inverter, which is a sixth embodiment of the present invention.

In a sixth embodiment of the present invention as illustrated in FIG. 7, control circuit $50_5$ uses transistor 508 for an error detector. The base of the transistor 508 is connected to a node between resistors 406 and 408. The emitter of transistor 508 is connected through resistor 510 to the positive terminal of DC power source 102, the collector of transistor 508, to the base of transistor 534 via resistor 532. Between the negative terminal of DC power source 102 and the emitter of transistor 508, a Zener diode 514 as a reference voltage source is placed with the cathode connecting to the emitter of transistor 508. Transistor 508 is connected at the collector to the negative terminal of DC power source 102. Diode 536, and resistors 538 and 540 are connected in series between the base and emitter of that transistor, as shown. Diode 542 is forwardly connected between the connection point of resistors 538 and 540 and the base of transistor 302. Control circuit $50_5$ further includes ballast 530 with a feedback winding. Ballast 530 is connected at one end of its secondary winding $530_2$ with the base of transistor 302, and at the other end of its secondary winding $530_2$ with one end of capacitor 544. The other end of capacitor 544 is connected to the collector of transistor 534. Diode 14 is connected between the collector and emitter of transistor 302. In the load side, a series circuit of the secondary winding $206_2$ of output transformer 206 and load 12 contains the primary winding $530_1$ of ballast 530. The remaining circuit arrangement of the present embodiment is substantially the same as that of the fifth embodiment, and further description of it will be omitted.

Now, the operation of the sixth embodiment will be explained below. Note that what follows explains only those portions of the operation that are different from those of the first through fifth embodiments.

The current flowing into the secondary winding $530_2$ of ballast 530 during the on period of transistor 302, goes from the base of transistor 530 through the emitter to capacitor 544. Through such a loop, capacitor 544 is charged by the base current, and at the termination of charging the capacitor, the base current of transistor 302 decreases to zero and the transistor is turned off. When transistor 302 is turned off, the discharge current flows out of capacitor 544, and goes through the collector and emitter of transistor 534, and resistor 540 and diode 542, and reaches the secondary winding $530_2$ of ballast 530. During the off period of transistor 302, the resonating operation of voltage resonance circuit $20_2$ induces an AC voltage in the secondary winding $206_2$ of output transformer 206. The induction of the AC voltage inverts the polarity of the load current, and returns it to the original one. In turn, the voltage applied to the base becomes positive in polarity, and it turns on transistor 302 again.

In the present embodiment, the frequency control is based on a discharge time constant of capacitor 544. In a stationary mode, a potential applied to the resistors 406 and 408 of voltage detector $40_1$ varies with the collector-emitter voltage of transistor 302. A conduction state of transistor 508 changes, and the collector current of transistor 508 changes. Then, a current flowing into diode 536 and resistor 538 also changes. Consequently, a base potential of transistor 534 also changes. A total resistance of the resistance of resistor 540 and an equivalent resistance of transistor 534, which depends on a degree of its conduction, varies, and this defines a discharge time constant of capacitor 544, and defines the base current of transistor 302. For example, if an equivalent resistance of transistor 534 is large, an amount of discharge from capacitor 544 is lessened during the off period of transistor 302, and an amount of base current flowing during the on period of transistor 302 decreases. Conversely, if it is small, the base current increases.

The on period of transistor 302 is determined by an amount (period) of the base current of transistor 302, and the base current is determined by transistor 534 and resistor 540, as described above. Accordingly, an oscillating frequency of the inverter may be varied by varying the impedance of transistor 534.

Figure 8:
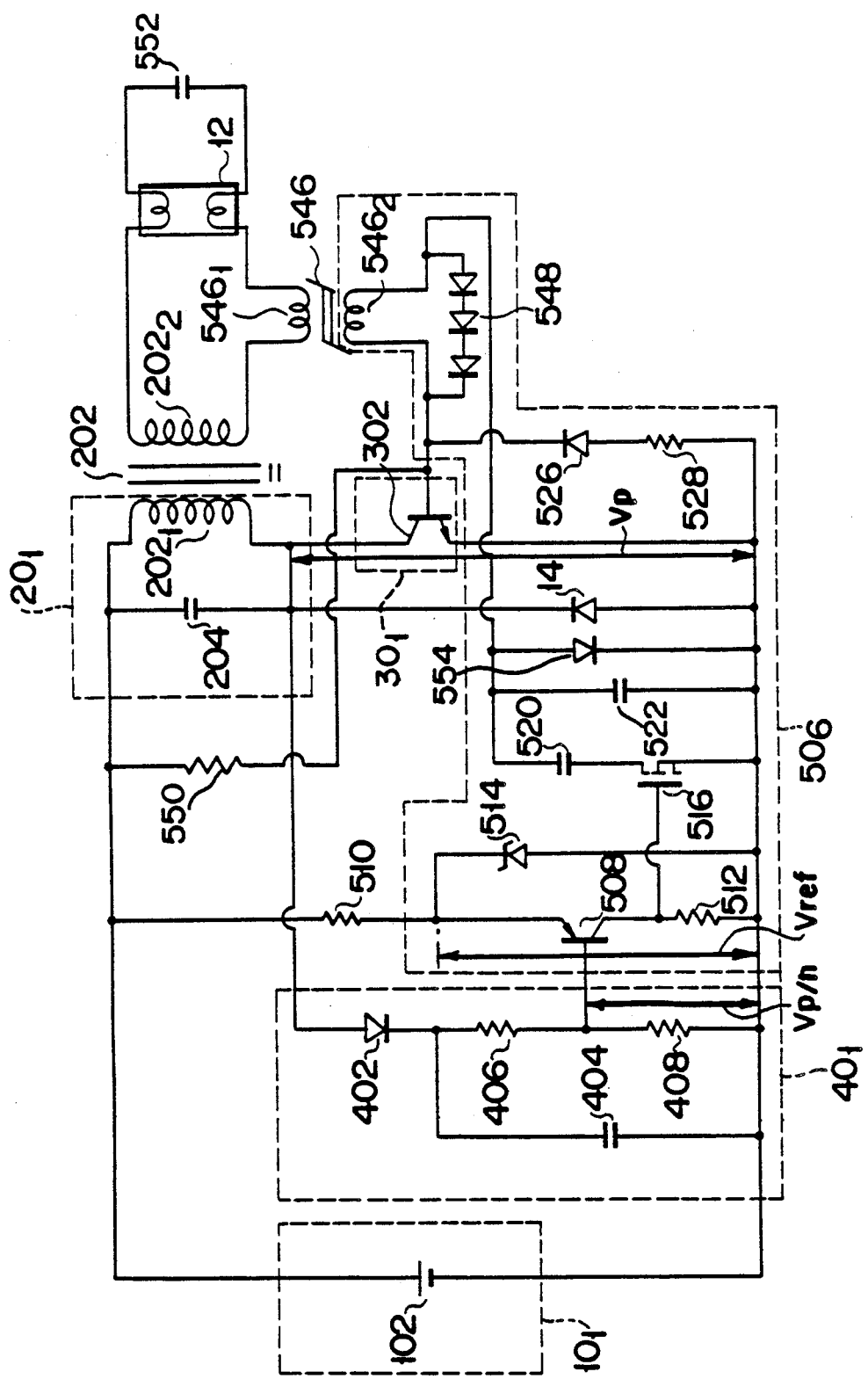
FIG. 8 is a circuit diagram showing an operator a discharge lamp using a self-excited inverter, which is a seventh embodiment of the present invention.

FIG. 8 shows a seventh embodiment of the present invention, in which the ballast with a feedback winding in the fifth embodiment is replaced by a feedback current transformer of the saturable type. In the figure, like reference symbols designate like or equivalent portions in FIGS. 1, 3 through 7, and the construction and a common operation of the fourth embodiment will not be described, for simplicity.

Control circuit $50_6$ in FIG. 8 uses a feedback current transformer (CT) of the saturable type in place of the ballast 530 in the control circuit of the fifth embodiment. Saturable type CT 546 for causing transistor 302 to oscillate in a self-excited mode, is so arranged that the secondary winding $546_2$ of CT 546 is connected at one end to the base of transistor 302, and at the other end to one end of capacitor 522 for frequency control. Diode 548 is coupled across the secondary winding $546_2$ of CT 546, with its cathode connecting to the base of transistor 302.

In this instance, output transformer 202 of the leakage type is used in place of output transformer 206. Capacitor 204 is connected across the primary winding $202_1$. In the load side, a series circuit of the secondary winding $202_2$ of output transformer 202 of the leakage type, load (discharge lamp) 12, and start-up capacitor 550, contains the primary winding $546_1$ of saturable type CT 546. Start-up capacitor 550 resonates mainly with a leakage inductance of output transformer 202, before discharge lamp (load) 12 lights on. A high voltage is generated by the resonance, and lights on the discharge lamp. After the lamp lights on, an equivalent resistance is inserted in the resonance circuit of capacitor 550 and transformer 202, and therefore, the resonating operation is stopped. Further, before the lamp lights on, a current enough to preheat the filament is fed, and it is limited to a proper value after the lamp lights on.

Start-up resistor 552 is connected to the base of transistor 302 and the positive terminal of DC power source 102. Frequency control capacitor 522 is coupled in parallel with diode 554 whose polarity is arranged with respect to the capacitor, as shown.

The remaining circuit arrangement is substantially the same as that of the fifth embodiment, and hence no further description will be given.

An eighth embodiment of the present invention will be described with reference to FIG. 9. The present embodiment is equivalent to a case that the ballast with a feedback winding in the FIG. 7 embodiment is substituted by a feedback current transformer of the saturable type. In the figure, like reference symbols designate like or equivalent portions in FIGS. 1, 3 through 8, and the construction and a basic operation of the fourth embodiment will not be described, for simplicity.

Figure 9:
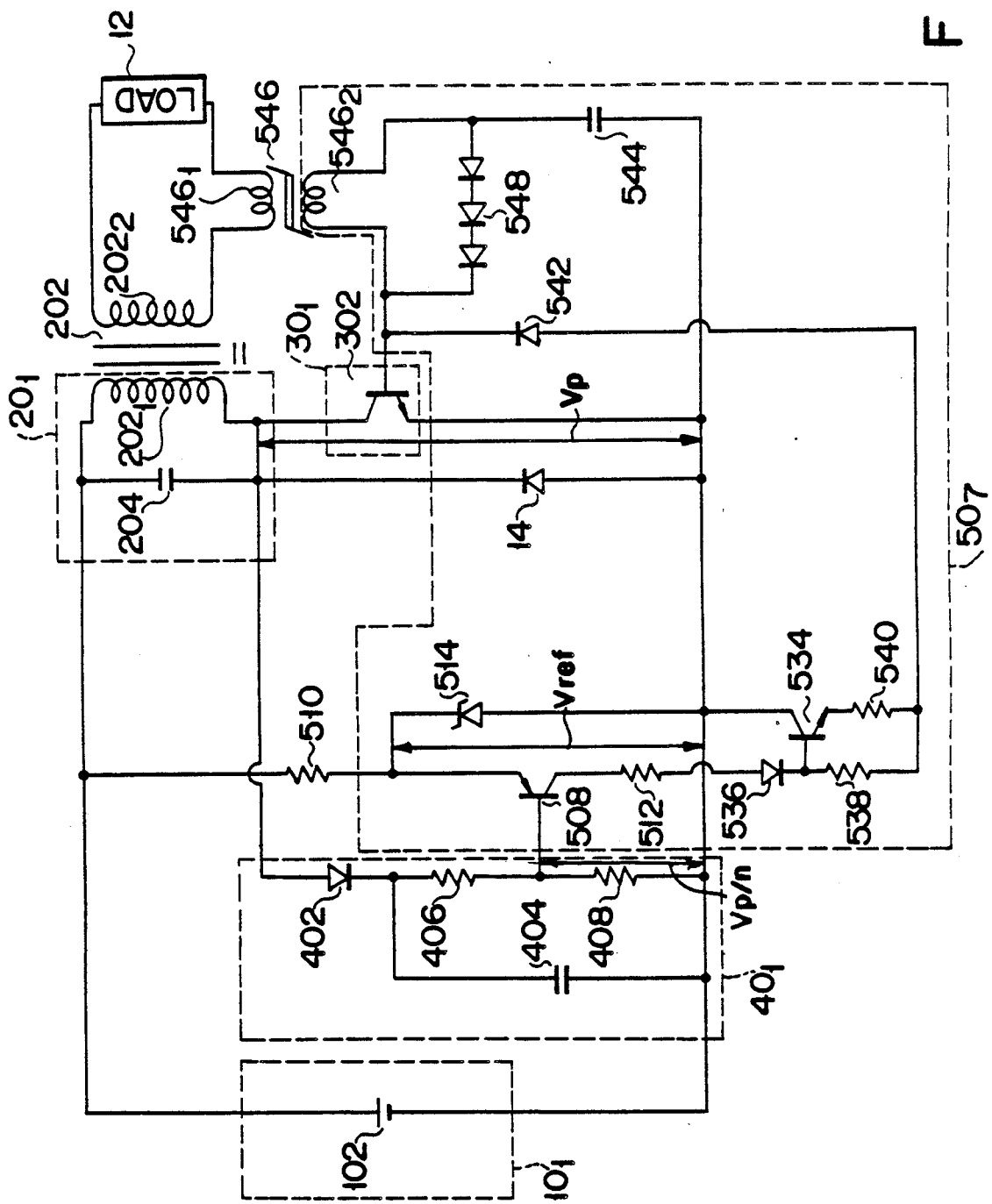
FIG. 9 is a circuit diagram showing an operator a discharge lamp using a self-excited inverter, which is an eighth embodiment of the present invention.

In control circuit $50_7$ in FIG. 9, a feedback current transformer (CT) of the saturable type is used in place of the ballast in the FIG. 7 control circuit. Saturable type CT 546 is arranged such that the secondary winding $546_2$ is connected at one end to the base of transistor 302, and at the other end to one end of capacitor 544 for frequency control. Diode 548 is connected across the secondary winding $546_2$ of CT 546, with its cathode connecting to the base of transistor 302.

Output transformer 202 is of the leakage type, with its primary winding $202_1$ coupled across capacitor 204. In the load side, a series circuit of the secondary winding $202_2$ of output transformer and load 12 contains the primary winding $546_1$ of CT 546.

The remaining circuit arrangement and the basis operation of the present embodiment are substantially the same as that of the sixth embodiment, and further description of them will be omitted.

What is claimed is:

1. An inverter capable of controlling an operating frequency, comprising:
    means for supplying a DC voltage;
    switching means, including a switching transistor, for switching the voltage from said DC voltage supply means;
    a parallel voltage resonance circuit including an inductor coupled in series with said switching means, said inductor and said switching means both being connected between both ends of said DC voltage supply means, and a resonance capacitor;
    voltage detecting means for detecting a voltage applied to said switching means, said voltage detecting means including a series circuit comprising a diode and a capacitor, said series circuit being coupled in parallel with said switching means, to detect a voltage across said charged capacitor, wherein said voltage detecting means further includes resistors coupled across said capacitor and for dividing said voltage, and wherein said comparing means compares the divided voltage and the reference voltage; and
    control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, wherein said comparing means includes a comparing transistor of which a base is connected to a node between said voltage dividing resistors, an emitter and a collector are respectively coupled with both ends of said DC voltage supply means, and a Zener diode reverse coupled between the emitter and the collector of said comparing transistor, said Zener diode providing the reference voltage, and said frequency control means includes a feedback current transformer whose secondary winding is connected at a first end with the base of said switching transistor, and a frequency varying means coupled between the collector of said comparing transistor and the second end of said comparing transistor.

2. The inverter according to claim 1, wherein said frequency varying means includes a first frequency controlling capacitor, a variable impedance element of a field effect transistor of which a gate is connected to the collector of said comparing transistor, a drain is connected to a first end of said first frequency control capacitor, and a source is connected to the second end of said DC voltage supply means, and a second frequency controlling capacitor connected to the second end of said first frequency control capacitor and the source of said field effect transistor.

3. An inverter capable of controlling an operating frequency, comprising:
means for supplying a DC voltage
switching means, including a switching transistor, for switching the voltage from said DC voltage supply means;
a parallel voltage resonance circuit including an inductor coupled in series with said switching means, said inductor and said switching means both being connected between both ends of said DC voltage supply means, and a resonance capacitor;
voltage detecting means for detecting a voltage applied to said switching means, said voltage detecting means including a series circuit comprising a diode and a capacitor, said series circuit being coupled in parallel with said switching means, to detect a voltage across said charged capacitor, wherein said voltage detecting means further includes resistors coupled across said capacitor and for dividing said voltage, and wherein said comparing means compares the divided voltage and the reference voltage; and
control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, wherein said comparing means includes a comparing transistor of which a base is connected to a node between said voltage dividing resistors, an emitter and a collector are respectively coupled with both ends of said DC voltage supply means, and a Zener diode reverse coupled between the emitter and the collector of said comparing transistor, said Zener diode providing the reference voltage, and said frequency control means, includes a feedback winding which is magnetically coupled at a first end with the base of said switching transistor, a frequency varying means coupled between the collector of said comparing transistor and the second end of said feedback winding, and a feedback series circuit coupled between the base and the emitter of said switching transistor, said series circuit comprises a resistor and a diode being reverse directed in polarity with respect to said switching transistor.

4. The inverter according to claim 3, wherein said frequency varying means includes a first frequency controlling capacitor, a variable impedance element of a field effect transistor of which a gate is connected to the collector of said comparing transistor, a drain is connected to a first end of said first frequency control capacitor, and a course is connected to the second end of said DC voltage supply means, and a second frequency controlling capacitor connected to the second end of said first frequency control capacitor and the source of said field effect transistor.

5. An inverter capable of controlling an operating frequency, comprising:
means for supplying a DC voltage;
switching means, including a switching transistor, for switching the voltage from said DC voltage supply means;
a parallel voltage resonance circuit including an inductor coupled in series with said switching means, said inductor and said switching means both being connected between both ends of said DC voltage supply means, and a resonance capacitor;
voltage detecting means for detecting a voltage applied to said switching means, said voltage detecting means including a series circuit comprising a diode and a capacitor, said series circuit being coupled in parallel with said switching means, to detect a voltage across said charged capacitor, wherein said voltage detecting means further includes resistors coupled across said capacitor and for dividing said voltage, and wherein said comparing means compares the divided voltage and the reference voltage; and
control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, wherein said comparing means includes a comparing transistor of which a base is connected to a node between said voltage dividing resistors, an emitter and a collector are respectively coupled with both ends of said DC voltage supply means, and a Zener diode reverse coupled between the emitter and the collector of said comparing transistor, said Zener diode providing the reference voltage, and said frequency control means includes a secondary winding of a ballast with a feedback winding, said secondary winding being coupled at a first end with the base of said switching transistor, a frequency varying means coupled between the collector of said comparing transistor and the second end of said secondary winding of the ballast, and a feedback series circuit coupled between the base and the emitter of said switching transistor, said series circuit comprises a resistor and a diode being reverse directed in polarity with respect to said switching transistor.

6. The inverter according to claim 3, wherein said frequency varying means includes a first frequency controlling capacitor, a variable impedance element of a field effect transistor of which a gate is connected to the collector of said comparing transistor, a drain is connected to a first end ὁ said first frequency control capacitor, and a source is connected to the second end of said DC voltage supply means, and a second frequency controlling capacitor connected to the second end of said first frequency control capacitor and the source of said field effect transistor.

7. An inverter capable of controlling an operating frequency comprising:
means for supplying a DC voltage;
switching means, including a switching transistor, for switching the voltage from said DC voltage supply means;
a parallel voltage resonance circuit including an inductor coupled in series with said switching means, said inductor and said switching means both being connected between both end of said DC voltage supply means, and a resonance capacitor;
voltage detecting means for detecting a voltage applied to said switching means, said voltage detecting means including a series circuit comprising a diode and a capacitor, said series circuit being coupled in parallel with said switching means, to detect a voltage across said charged capacitor, wherein said voltage detecting means further includes resistors coupled across said capacitor and for dividing said voltage, and wherein said comparing means compares the divided voltage and the reference voltage; and
control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, wherein said comparing means includes a comparing device of which a base is connected to a node between said voltage dividing resistors, an emitter and a collector are respectively coupled with a first end of said DC voltage supply means and a predetermined junction point, and a Zener diode reverse coupled between the emitter and the collector of said comparing transistor, said Zener diode providing the reference voltage, and said frequency control means includes a secondary winding of a ballast with a feedback winding, said secondary winding being coupled at a first end with the base of said switching transistor, and a frequency varying means coupled between a second end of said DC voltage supply means, and said junction point and said secondary winding of the ballast.

8. The inverter according to claim 7, wherein said frequency varying means includes a control transistor of which base is connected to said junction point, and the collector is connected to said DC power supply means, a control resistor and a diode being coupled between the base and emitter of said control transistor a feedback diode connected between said control resistor and the first end of the secondary winding of the ballast, and a frequency control capacitor coupled between the second end of the secondary winding of the ballast and the second end of said DC voltage supply means.

9. An inverter capable of controlling an operating frequency, comprising:
means for supplying a DC voltage;
switching means, including a switching transistor, for switching the voltage from said DC voltage supply means;
a parallel voltage resonance circuit including an inductor coupled in series with said switching means, said inductor and said switching means both being connected between both ends of said DC voltage supply means, and a resonance capacitor;
voltage detecting means for detecting a voltage applied to said switching means, said voltage detecting means including a series circuit comprising a diode and a capacitor, said series circuit being coupled in parallel with said switching means, to detect a voltage across said charged capacitor, wherein said voltage detecting means further includes resistors coupled across said capacitor and for dividing said voltage, and wherein said comparing means, compares the divided voltage and the reference voltage; and
control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, wherein said comparing means includes a comparing transistor of which a base is connected to a node between said voltage dividing resistors, an emitter and a collector are respectively coupled with both ends of said DC voltage supply means, and a Zener diode reverse coupled between the emitter and the collector of said comparing transistor, said Zener diode providing the reference voltage, and said frequency control means includes a secondary winding of a saturable feedback current transformer being coupled at a first end with the base of said switching transistor, a diode connected in parallel with the secondary winding of said saturable feedback current transformer, a frequency varying means coupled between the collector of said comparing transistor and the second end of the secondary winding of said transformer, and a feedback series circuit coupled between the base and the emitter of said switching transistor, said series circuit comprises a resistor and a diode being reversely directed in polarity with respect to said switching transistor.

10. The inverter according to claim 9, wherein said frequency varying means includes a first frequency controlling capacitor, a variable impedance element of a field effect transistor of which a gate is connected to the collector of said comparing transistor, a drain is connected to a first end of said first frequency control capacitor, and a source is connected to the second end of said DC voltage supply means, and a second frequency controlling capacitor connected to the second end of said first frequency control capacitor and the source of said field effect transistor.

11. An inverter capable of controlling an operating frequency, comprising:
   means for supplying a DC voltage;
   switching means, including a switching transistor, for switching the voltage from said DC voltage supply means:
   a parallel voltage resonance circuit including an inductor coupled in series with said switching means, said inductor and said switching means both being connected between both ends of said DC voltage supply means, and a resonance capacitor;
   voltage detecting means for detecting a voltage applied to said switching means, said voltage detecting means including a series circuit comprising a diode and a capacitor, said series circuit being coupled in parallel with said switching means, to detect a voltage across said charged capacitor, wherein said voltage detecting means further includes resistors coupled across said capacitor and for dividing said voltage, and wherein said comparing means compares the divided voltage and the reference voltage; and
   control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, wherein said comparing means includes a comparing transistor of which a base is connected to a node between said voltage dividing resistors, an emitter and a collector are respectively coupled with a first end of said DC voltage supply means and a predetermined junction point, and a Zener diode reverse coupled between the emitter and the collector of said comparing transistor, said Zener diode providing the reference voltage, and said frequency control means includes a secondary winding of a saturable feedback current transformer being coupled at a first end with the base of said switching transistor, a diode connected in parallel with the secondary winding of said saturable feedback current transformer, and a frequency varying means coupled between a second end of said DC voltage supply means, and said junction point and the secondary winding of said transformer.

12. The inverter according to claim 11, wherein said frequency varying means includes a control transistor of which base is connected to said junction point, and the collector is connected to said DC power supply means, a control resistor and a diode being coupled between the base and emitter of said control transistor, a feedback diode connected between said control resistor and the first end of the secondary winding of said transformer, and a frequency control capacitor coupled between the second end of the secondary winding of said transformer and the second end of said DC voltage supply means.

13. An inverter capable of controlling an operating frequency, comprising:
   means for supplying a DC voltage;
   switching means, including a switching transistor, for switching the voltage from said DC voltage supply means;
   a parallel voltage resonance circuit including an inductor coupled in series with said switching means, said inductor and said switching means both being connected between both ends of said DC voltage supply means, and a resonance capacitor;
   voltage detecting means for detecting a voltage applied to said switching means, said voltage detecting means including a series circuit comprising a diode and a detecting capacitor, said series circuit being coupled in parallel with said switching means, to detect a voltage across said charged capacitor, wherein said voltage detecting means further includes resistors coupled across said capacitor and for dividing said voltage, and wherein said comparing means compares the divided voltage and the reference voltage; and
   control means for controlling a switching frequency of said switching means, on the basis of the result of comparison of a voltage value detected by said voltage detecting means and a predetermined reference voltage, wherein said control means includes a comparing means for comparing said voltage detected by said voltage detecting means with the predetermined reference voltage, and a frequency control means for controlling a switching signal to be applied to said switching means according to the result of the comparison by said comparing means, further comprising a ceramic varistor for absorbing a surge connected in parallel with said detecting capacitor.

14. A DC-AC inverter capable of controlling an operating frequency, comprising:
   means for supplying a DC voltage;
   a switching transistor for switching the voltage from said DC voltage supply means, said switching means having a base, a collector and an emitter;
   a parallel voltage resonance circuit for supplying an AC output to a load, said parallel voltage resonance circuit including an inductor in parallel with a resonance capacitor, coupled in series with said switching transistor, said inductor and said switching transistor being connected between both ends of said DC voltage supply means;
   voltage detecting means having a diode and having a detecting capacitor connected in series to said diode, said diode and said detecting capacitor being connected in parallel to the collector and emitter of the switching transistor, thereby to detect a voltage applied to said switching transistor;

comparing means for comparing a detection voltage supplied from said voltage detecting means with a predetermined reference voltage, and for outputting an error voltage based on the comparison result; and frequency control means having a feedback winding for inducing an AC output in accordance with an output of said parallel voltage resonance circuit and supplying the AC output to the base and emitter of the switching transistor to turn on/off the switching transistor, said feedback winding serving as a current source for the base of the switching transistor while the switching transistor is being turned on, at least one control capacitor provided in a base current supply path formed by said feedback winding and connected to the base of the switching transistor, said capacitor being charged with the base current for determining the turning-on period of the switching transistor in accordance with the level of charge due to the base current, and including discharge means formed by a series circuit of a diode and a resistor connected in parallel to said control capacitor in said base current supply path, said discharge means constituting a path for discharging the control capacitor during the turning-off time period of the switching transistor, and semiconductor means connected to the discharge means to set a discharge resistance value of said discharge means, and controlling the degree of conductivity of the discharge means in accordance with the error voltage supplied from said comparing means, thereby to control the discharge amount of the control capacitor and change the turning-on time period of the next cycle of the operation of the switching transistor so as to reduce said error voltage.

15. The inverter according to claim 14, wherein said voltage detecting means further includes resistors coupled across said detecting capacitor and for dividing said voltage, and said comparing means compares the divided voltage and the reference voltage.

16. A DC-AC inverter capable of controlling an operating frequency, comprising:

means for supplying a DC voltage;

a switching transistor for switching the voltage from said DC voltage supply means, said switching transistor having a base, a collector and an emitter, a parallel voltage resonance circuit for supplying an AC output to a load, said parallel voltage resonance circuit including an inductor coupled in series with said switching transistor, and a resonance capacitor, said inductor and said switching transistor both being connected between both ends of said DC voltage supply means, and said resonance capacitor;

voltage detecting means having a diode connected in the same direction as a collector emitter junction of the switching transistor and having a detecting capacitor connected in series to said diode, said diode and said detecting capacitor being connected in parallel to the collector emitter junction of the switching transistor, thereby to detect a voltage applied to said base emitter junction of said switching transistor;

comparing means for comparing a detection voltage supplied from said voltage detecting means with a predetermined reference voltage, and for outputting an error voltage based on a result of the comparison;

frequency control means having a feedback winding for inducing an AC output in accordance with an output of said parallel voltage resonance circuit and supplying the AC output between the base and emitter of the switching transistor to turn on/off the switching transistor, to form a current source for the base of the switching transistor while the switching transistor is being turned on, at least one control capacitor provided in a base current supply path formed by said feedback winding and connected to the base of the switching transistor, said capacitor being charged with the base current for determining a turning-on period of the switching transistor in accordance with a level of charge due to the base current, and semiconductor means connected to said control capacitor to control a charge amount of the control capacitor, a degree of conductivity of the semiconductor means being controlled in accordance with a value of said error voltage supplied from the comparing means thereby to control the level of charge in the control capacitor and change the turning-on period of the switching transistor so as to reduce the error voltage.

* * * * *